United States Patent [19]
Yoshino

[11] Patent Number: 5,508,106
[45] Date of Patent: Apr. 16, 1996

[54] METHOD OF VACUUM INSULATION AND A VACUUM HEAT INSULATOR USED THEREIN

[75] Inventor: Akira Yoshino, Osaka, Japan

[73] Assignee: Daidousanso Co., Ltd., Osaka, Japan

[21] Appl. No.: 340,487

[22] Filed: Nov. 14, 1994

Related U.S. Application Data

[63] Continuation of Ser. No. 771,988, Oct. 8, 1991, abandoned.

[30] Foreign Application Priority Data

Oct. 9, 1990 [JP] Japan .................................. 2-106483
Oct. 9, 1990 [JP] Japan .................................. 2-271665

[51] Int. Cl.⁶ .................................................. B32B 5/16
[52] U.S. Cl. .......................... 428/323; 428/284; 428/285; 428/325; 428/432; 428/457; 428/468; 427/177; 220/450; 220/400; 220/452; 220/420
[58] Field of Search ..................... 428/284, 285, 428/432, 457, 325, 463, 323; 427/177; 220/450, 420, 400, 452

[56] References Cited

U.S. PATENT DOCUMENTS 3,152,033 10/1964 Black et al. ............................ 428/138
4,581,285 4/1986 Mehefkey ............................... 428/285

FOREIGN PATENT DOCUMENTS 0104790 4/1984 European Pat. Off. .
2378576 8/1978 France .
887345 1/1962 United Kingdom .

*Primary Examiner*—Leszek Kiliman
*Attorney, Agent, or Firm*—Armstrong, Westerman, Hattori, McLeland & Naughton

[57] ABSTRACT

The invention is composed of a non-aluminium metallic foil with a ceramic particle dotted layer formed on one side thereof is used and the non-aluminium metallic foil is wound on the peripheral surface of an inner shell of a duplex shell body in a state that the ceramic particle dotted layer is faced inwardly, wherein the circumference of the multi-layeredly wound layer is covered with an outer shell of the duplex shell body, and a space between the inner shell and the outer shell is sealed and evacuated.

6 Claims, 1 Drawing Sheet

U.S. Patent    Apr. 16, 1996    5,508,106
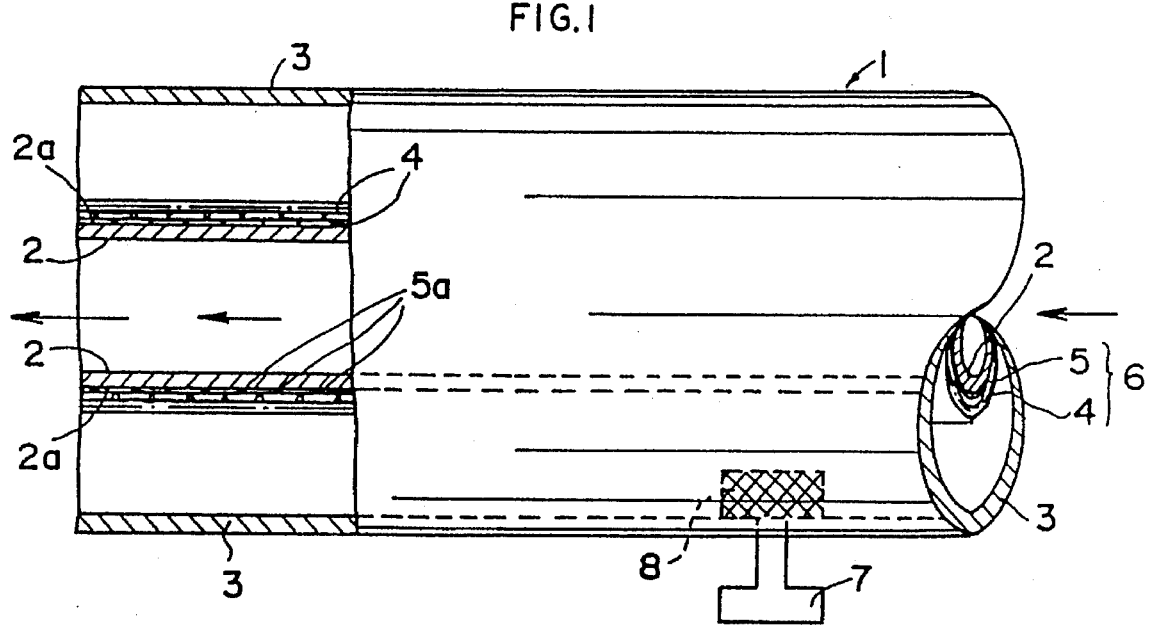
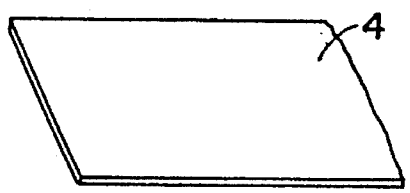
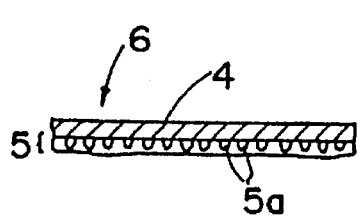
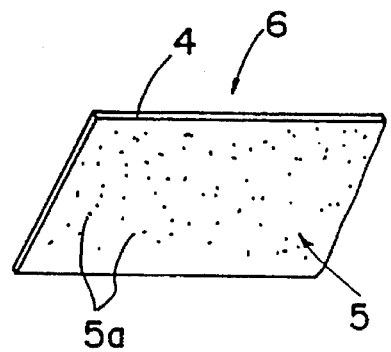
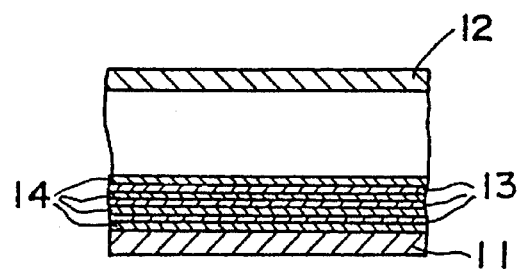

METHOD OF VACUUM INSULATION AND A VACUUM HEAT INSULATOR USED THEREIN

This application is a continuation of application Ser. No. 07/771,988, filed Oct. 8, 1991, now abandoned.

TECHNICAL FIELD

This invention relates to a method of high vacuum heat insulation wherein a space between an inner shell and an outer shell of a vacuum heat insulation duplex shell body such as a vacuum heat insulation duplex pipe and a vacuum heat insulation duplex vessel is heat insulated by evacuating, and to a high vacuum heat insulator used therein.

PRIOR ART

Conventionally a vacuum insulation duplex tube is used for a liquid pipeline to transfer fluid with ultra low temperature such as liquid nitrogen from a view of heat insulation property. In general, a multi-layer vacuum heat insulation method (so called superinsulation) is employed as a method of vacuum heat-insulation of a vacant space between an inner pipe and an outer pipe of the vacuum heat insulation duplex tube. In this multi-layer vacuum thermal insulation method, aluminium foil 13 and asbestos paper, so-called Dexter paper 14, which are vacuum insulators, are wound alternately in multi-layer (about 25 to 50 layers) on a peripheral surface of the inner pipe 11 of the vacuum insulation duplex pipeline and then the most outer layer of the lapped body is covered by the outer tube 12 having an interval. In this state a space between the outer pipe 12 and the inner pipe 11 is evacuated to high vacuum (to less than $10^{-4}$ Torr). FIG. 5 shows an enlarged view of thus obtained space between the inner pipe 11 and the outer pipe 12 of the vacuum insulation duplex pipeline. In the figure, the space between the inner pipe 11 and the outer pipe 12 is in a vacuum state and in the space the lapped body in which the aluminium foil 13 and the Dexter paper are wound alternately in a multi-layered state is formed.

However, in the above-mentioned method, aluminum foil 13 and the Dexter paper 14 are used as a vacuum heat insulator and the heat insulator is wound multi-layeredly. In this case, the Dexter paper 14 becomes moisture rich because of high water absorption property of the Dexter paper itself. That is, when the Dexter paper 14 is used in an atmosphere containing high moisture, the Dexter paper 14 absorbs water content in the air since it is exposed to a high moisture atmosphere. Accordingly, even if the space is evacuated in such a high moisture absorbed state, it takes long time (for example, more than 480 hours) to evacuate because of the high moisture content being a resistance of evacuation. In order to exclude this disadvantage, whole of the duplex tube is heated to evaporate the moisture absorbed in the Dexter paper 14 prior to said evacuation. It allows to save time a little in evacuating. However, raising temperature is limited to 170° C. to 180° C. since fusion temperature of aluminum is low. So that it takes a long time to exhaust $H_2$, $O_2$, $N_2$, water content and the like adsorbed and occluded in the inner tube and outer tube of duplex stainless or the like. The temperatures can not also vaporize the absorbed water in the Dexter paper swiftly. Therefore, the time is, in fact, not shortened enough even by the above-mentioned heating.

OBJECT OF THE INVENTION

Accordingly, it is an object of the invention to provide a method of high vacuum heat insulation and a vacuum heat insulator used therein which can shorten evacuating time and maintain the insulation property for a long time.

SUMMARY OF THE INVENTION

In order to accomplish the above-mentioned object, this invention provides a method comprising steps of winding non-aluminium metallic foil with a ceramic particle dotted layer formed on one side thereof on a peripheral surface of an inner shell multi-layeredly in a state that the ceramic particle dotted layer is faced inwardly, covering the circumference of the multi-layeredly wound layer with an outer shell, sealing a space between the outer shell and the inner shell and evacuating the space in that state as a first gist, and a vacuum heat insulator characterized in that a ceramic particle dotted layer is formed on one side of non-aluminium metallic foil as a second gist.

The ceramic particle dotted layer used herein refers to a layer in which ceramic particles are fixed tightly on one side of metallic foil at predetermined intervals. Each particle is fixed with a predetermined interval from adjacent ceramic particles.

That is, in the method according to the present invention, after non-aluminum metallic foil with a ceramic particle dotted layer formed on one side thereof is used as an insulator, this layer is wound multi-layeredly on the peripheral surface of an inner shell of a high vacuum duplex tube in a state that the ceramic particle dotted layer faces inwardly, then the most outer layer of the lapped layers formed on the peripheral surface of the inner shell is covered with an outer shell of the duplex pipe having an interval, a space between the outer shell and the inner shell is sealed and in that state the space is evacuated. In this case, it does not take a long time to evacuate even if the above-mentioned metallic foil is applied under a high moisture atmosphere because the ceramic particle dotted layer has very little water absorption property compared with the Dexter paper. The ceramic particles are fixed in a scattered or dotted state, so that clearance between each particle performs as a passage of air to evacuate efficiently, when the non-aluminium metallic foil insulator is wound multi-layeredly and evacuation is conducted.

Followings are detailed description of this invention.

In this invention, non-aluminum metallic foil means various metallic foils except aluminum foil. If the non-aluminium foil is possible to be wound, thick one may be adopted, for example, of about 20 to 50 μm. In particular, a metallic foil which has high fusion temperature and has high radiation efficiency such as stainless steel foil and nickel foil is preferably used.

The ceramic particle dotted layer formed on one side of the metallic foil is generally formed by moving strip metallic foil longitudinally and by flame-spraying ceramic particles on the moving strip metallic foil, wherein a flame-spraying nozzle is moved reciprocately in a orthogonal direction against the moving surface of the moving direction of the strip metallic foil. Diameter of thus dotted and fixed particle in the formed ceramic particle dotted layer is set about 5 to 50 μm. Therefore the thickness of the layer is almost the same as the diameter. An interval between each ceramic particle is set about 50 to 500 μm, preferably the diameter 10 to 30 μm and the interval 100 to 200 μm.

High vacuum heat insulation using the heat insulator according to the invention is performed, for example, as follows. At first, non-aluminium metallic foil with a ceramic particle dotted layer formed on one side thereof is wound multi-layeredly on the peripheral surface of a inner shell of a vacuum heat insulation duplex shell body in a state that the dotted layer is faced inwardly, whereby the ceramic particle dotted layer and the metallic foil are lapped alternately and at the same time the presence of the dotted layer therebetween prevents contact of each metallic foil. Then the outer shell is covered around the most outer layer of the multi-layered body having an interval, the space between the inner and outer shell is sealed and evacuated to give a vacuum heat insulation duplex shell body.

BRIEF DESCRIPTION OF THE DRAWINGS

FIG. 1 shows an explanatory view of a high vacuum heat insulation duplex tube using an example according to the invention, FIG. 2 shows a perspective view of non-aluminium metallic foil composing vacuum insulator of an example according to the invention, FIG. 3 shows a cross-sectional view of the vacuum heat insulator according to the invention, FIG. 4 shows a perspective view when the vacuum insulator shown in FIG. 3 is observed from a ceramic particle dotted layer side, and FIG. 5 shows an enlarged view of a space between an inner tube and an outer tube in a conventional example.

This invention is further described in detail based on an example.

EXAMPLE 1

FIG. 1 shows an example of the vacuum insulation duplex pipe according to the invention. A heat vacuum insulator 6 is wound multi-layeredly between an inner pipe 2 and outer pipe 3. The vacuum insulator 6 comprises of non-aluminium metallic foil 4 shown in FIG. 2 and a ceramic particle dotted layer which is fixed on one side of the non-aluminium metallic foil 4. As the non-aluminum metallic foil 4, stainless steel foil is used in this example. The stainless steel foil 4 has higher fusion temperature than the aluminium metallic foil, so the stainless steel foil 4 can tolerate heating with high temperature such as 350° C. to 400° C. To this stainless steel foil 4 a dotted layer 5 (interval between each particle: 100±10 μm) comprising ceramic particles 5a having diameter of 50±5 μm is formed by flame-spraying on one side (back side) as shown in FIGS. 3 and 4. Particles of forsterite ($2MgO \cdot SiO_2$), magnesia(MgO), Alumina($Al_2O_3$) and the like are used as materials to compose the ceramic particle dotted layer 5.

Vacuum insulation between the inner tube 2 and the outer tube 3 of the vacuum heat insulation duplex tube 1 using such an insulator 6 is conducted as follows. The vacuum insulator 6 is wound multi-layeredly on peripheral surface 2a of the inner tube 2 for flowing ultra low temperature fluid such as liquid nitrogen. In this case, the ceramic particle dotted layer 5 is faced inwardly. Then, the most outer layer of the insulator lapped layer body is covered by the outer tube 3 having an interval and the space between the inner tube and the outer tube is sealed. The space between the inner tube 2 and the outer tube 3 is evacuated (24 to 50 hours) to high vacuum (to less than $10^{-4}$ Torr) through an exhaust pipe 7. The reference numeral 8 refers to a filter disposed at the exhaust pipe 7.

Effects of the Invention

As mentioned above, in the method of high vacuum heat insulation according to the invention, as a vacuum heat insulator, non-aluminium metallic foil with a ceramic particle dotted layer formed on one side thereof is used. The ceramic particle dotted layer has little water absorption property, so that it does not take so long time even if the metallic foil is applied in a high moisture atmosphere. Since what the ceramic particles are fixed on the non-aluminium metallic foil is used as the vacuum heat insulator, fusion of the metallic foil is not caused even if the evacuation is conducted at high temperature. Therefore, it makes possible to exhaust of $H_2$, $O_3$, $N_2$ and the like occluded in the stainless steel inner and outer tubes composing the duplex shell body in short time. The ceramic particle dotted layer is formed by fixing ceramic particles not closely, but roughly so that some clearance or interval is formed. Therefore, when a space between the inner shell and the outer shell is provided with the vacuum heat insulator multi-layeredly and then evacuated, the clearance becomes a passage of air to be able to evacuate efficiently.

What is claimed is:

1. A method of high vacuum heat insulation comprising steps of winding non-aluminum metallic foil multi-layerdly on a peripheral surface of an inner shell, the non-aluminum metallic foil being provided with a ceramic particle dotted layer formed on one side thereof, such that the ceramic particle dotted layer is faced inwardly during the step of winding, and an interval between each ceramic-particle of the ceramic particle dotted layer is set at about 50 to 500 μm, providing an outer shell around the circumference of the multi-layeredly wound layer, sealing a space between the outer shell and the inner shell and evacuating the space in that state at a temperature tip to 350° to 400° C.

2. A method of high vacuum heat insulation defined in claim 1, in which non-aluminum metallic foil is stainless foil, copper foil or nickel foil.

3. A method of high vacuum heat insulation defined in claim 1, wherein an interval between each ceramic particle is set at about 100–200 μm.

4. A method of high vacuum heat insulation defined in claim 1, wherein a diameter of the ceramic particles is set at about 5 to 50 μm.

5. A method of high vacuum heat insulation defined in claim 1, wherein a diameter of the ceramic particles is set at about 10 to 30 μm.

6. A method of high vacuum heat insulation defined in claim 1, wherein the space is evacuated from 24 to 50 hours to a vacuum of less than $10^{-4}$ Torr.

\* \* \* \* \*